United States Patent
Nakadate et al.

(10) Patent No.: US 9,769,985 B2
(45) Date of Patent: *Sep. 26, 2017

(54) WORK APPARATUS WITH SAFETY EQUIPMENT

(75) Inventors: Shunsuke Nakadate, Tokyo (JP); Tadashi Ishimura, Saitama (JP)

(73) Assignee: Yamabiko Corporation, Tokyo (JP)

(*) Notice: Subject to any disclaimer, the term of this patent is extended or adjusted under 35 U.S.C. 154(b) by 1185 days.

This patent is subject to a terminal disclaimer.

(21) Appl. No.: 12/784,536

(22) Filed: May 21, 2010

(65) Prior Publication Data

US 2010/0294098 A1 Nov. 25, 2010

(30) Foreign Application Priority Data

May 21, 2009 (JP) ................................. 2009-123600

(51) Int. Cl.
 A01D 34/82 (2006.01)
 A01D 75/20 (2006.01)
 F16P 3/00 (2006.01)

(52) U.S. Cl.
 CPC ........... *A01D 34/828* (2013.01); *A01D 75/20* (2013.01); *A01D 75/206* (2013.01); *F16P 3/008* (2013.01); *Y10T 83/089* (2015.04)

(58) Field of Classification Search
 CPC ...... A01D 34/828; A01D 75/18; A01D 75/20; A01D 75/206; F16P 3/008; Y10S 56/15; Y10T 83/081; Y10T 83/089; Y10T 83/175; Y10T 83/85
 USPC ........ 30/276; 56/DIG. 15; 83/58, 62.1, 76.7, 83/522.12; 340/680; 700/159, 174, 177
 See application file for complete search history.

(56) References Cited

U.S. PATENT DOCUMENTS

| | | | | |
|---|---|---|---|---|
| 2,748,810 | A | * 6/1956 | Strunk | B27B 17/12 30/123.4 |
| 3,353,525 | A | * 11/1967 | Nutten et al. | F02B 63/02 123/339.1 |
| 3,606,745 | A | 9/1971 | Girodat | |
| 3,923,126 | A | * 12/1975 | Bidanset | 188/77 W |
| 4,178,741 | A | 12/1979 | Lonn et al. | |
| 4,553,326 | A | * 11/1985 | West | 30/381 |
| 4,793,064 | A | * 12/1988 | Nagashima | 30/382 |
| 6,111,515 | A | * 8/2000 | Schaer et al. | B25F 5/00 340/679 |

(Continued)

FOREIGN PATENT DOCUMENTS

| | | |
|---|---|---|
| JP | 62-198320 | 9/1987 |
| JP | 02-131822 | 11/1990 |

(Continued)

OTHER PUBLICATIONS

Extended European Search Report issued in corresponding European Patent Application No. 10163546.4 dated Aug. 20, 2010 (3 pages).

(Continued)

*Primary Examiner* — Clark F Dexter
(74) *Attorney, Agent, or Firm* — Kilyk & Bowersox, P.L.L.C.

(57) ABSTRACT

An engine-driven brush cutter (100) equipped with a safety device (42) that includes an acceleration sensor unit (24) attached to a drive unit (4) in an aslant orientation such that a detection axis (DA) of the sensor unit (24) inclines by an angle ($\theta 1$) relative to the right-and-left direction (R-L) of the brush cutter (100). This inclined orientation of the detection axis (DA) contributes to lowering the sensitivity of the sensor unit (24) to impulses in the direction parallel to a moving direction of a cutting blade (40) operated by an operator at work.

6 Claims, 14 Drawing Sheets

(56) References Cited

U.S. PATENT DOCUMENTS

| | | | |
|---|---|---|---|
| 6,213,066 B1* | 4/2001 | Dahlberg et al. | F02B 63/02 123/184.23 |
| 8,818,548 B2* | 8/2014 | Aoki et al. | A01D 34/828 340/680 |
| 2004/0181951 A1* | 9/2004 | Wittke | B23D 59/001 30/382 |
| 2006/0090351 A1 | 5/2006 | Yoshida | |
| 2008/0235958 A1* | 10/2008 | Yoshida | A01D 34/90 30/276 |
| 2010/0064532 A1* | 3/2010 | Wittke et al. | B27G 19/003 30/382 |
| 2010/0257743 A1* | 10/2010 | George | B27B 17/083 30/383 |
| 2010/0294097 A1* | 11/2010 | Aoki et al. | A01D 34/828 83/58 |
| 2010/0294098 A1* | 11/2010 | Nakadate et al. | A01D 34/828 83/62.1 |

FOREIGN PATENT DOCUMENTS

| | | |
|---|---|---|
| JP | 04-158714 | 1/1992 |
| JP | 08-187024 | 7/1996 |
| JP | 2006-288296 | 10/2006 |
| JP | 2008-118960 | 5/2008 |

OTHER PUBLICATIONS

U.S. Appl. No. 12/783,886, filed May 20, 2010.
U.S. Appl. No. 12/783,838, filed May 20, 2010.

* cited by examiner

To external device

To external device

To external device

To external device

WORK APPARATUS WITH SAFETY EQUIPMENT

The present application claims priority from Japanese Patent Application No. 2009-123600, filed May 21, 2009, which is incorporated herein by reference.

FIELD OF THE INVENTION

The present invention relates to a powered outdoor work apparatus intended for use in brush cutting and equipped with a safety device for protecting a worker of the apparatus from its cutting blade when the worker is exposed to a sudden danger.

BACKGROUND OF THE INVENTION

Brush cutters, in general, have a handle for its user to grip. When a worker works for cutting grass or shrubs with the brush cutter, he/she moves both hands gripping the handle right and left to move the cutting blade, in high speed rotation, right and left. Known brush cutters include those of engine-driven ones driven by an internal combustion engine and motor-driven ones driven by an electric motor. From another standpoint, known brush cutters include those of a backpack type and those of a shoulder-strap type. In operation with a backpack type brush cutter, the user will carry its main body containing its drive source on his/her back. In operation with a shoulder-strap type brush cutter, the user will carry the main body on his/her shoulder with a strap extending from the main body of the brush cutter.

Brush cutters are work apparatuses having a cutting blade. For this reason, there have been developed brush cutters equipped with a safety device intended to protect the worker using the brush cutter from its cutting blade in order to assure his or her safety when any dangerous condition arises suddenly during the work.

Japanese Utility Model Laid-open Publication No. H02 (1990)-131822 (hereafter referred to as "Patent Document 1" as well) discloses a shoulder-strap type brush cutter. On each of right and left handles of the brush cutter, a stop lever is provided. The stop lever is actuated when grasped by the worker. When the worker takes his/her hand off at least one of the right and left stop levers, namely, when the stop lever is released, a fuel valve mechanically linked to the stop lever is closed, and forcibly stops fuel supply to the engine or supply of power to an ignition plug of the engine to thereby stop the engine from running.

Japanese Patent Laid-open Publication No. H04-(1992)-158714 (hereafter referred to as "Patent Document 2" as well) discloses a shoulder-strap type brush cutter in which a stop lever or pressure sensor is provided on a handle of the brush cutter to actuate an electromagnetic brake or mechanical stopper and thereby forcibly stop the rotation of the cutting blade when the worker unlinks hands from the handle.

Japanese Patent Laid-open Publication No. 2006-288296 (hereafter referred to as "Patent Document 3" as well) discloses a hand-held type electric brush cutter having a shock sensor. The shock sensor includes a piezoelectric element that abuts a circumferential part of a manipulation tube provided around a power transmission shaft connecting an electric motor or an engine as a drive source to a cutting blade. When the shock sensor detects a shock larger than a predetermined level, the motor is forcibly stopped. More specifically, a box surrounding the manipulation tube is provided near a handle fixed at a lengthwise central portion of the manipulation tube, and the shock sensor is affixed to the box in abutment with the manipulation tube. In this Patent Document 3, it is also proposed to provide, in the safety device including the shock sensor, a variable resistor for adjusting a current flowing through the shock sensor (piezoelectric element) to eliminate the variation in sensitivity from one piezoelectric element to another.

Japanese Patent Laid-open Publication No. H08(1996)-187024 (hereafter referred to as "Patent Document 4" as well) discloses a shoulder-strap type brush cutter including an internal combustion engine or electric motor as a drive source and a centrifugal clutch interposed between the drive source and a power transmission shaft mechanically connecting the drive source and a cutting blade. The centrifugal clutch includes a clutch shoe that is mechanically activated by a large relative displacement, if any, between the drive source and the power transmission shaft to automatically brake the centrifugal clutch.

Japanese Patent Laid-open Publication No. 2008-118960 (hereafter referred to as "Patent Document 5" as well) discloses a shoulder-strap type brush cutter. The strap for a worker to carry the brush cutter on his/her shoulder has a cap at its distal end, and it can detachably engage with a switch main body of the brush cutter. In this shoulder-strap type brush cutter, if the cutting blade hits a large stone or the like and the brush cutter itself is kicked back, the cap is disengaged from the switch body, and power supply to the ignition plug is forcibly interrupted to stop the engine.

Japanese Patent Laid-open Publication No. S62(1988)-198320 (hereafter referred to as "Patent Document 6" as well) proposes to provide a mercury switch that detects an angle of inclination of a manipulation tube provided around a power transmission shaft through which the output of an electric motor is transmitted to a cutting blade. In this proposal, once the detected inclination angle of the manipulation tube gets out of a predetermined range, power supply to the electric motor is interrupted to forcibly stop the electric motor.

Problems to be Solved by the Invention

Among the existing safety devices, those ones disclosed in Patent Documents 1 and 2, for example, are designed to operate only under the condition that the worker using the brush cutter unlinks hands from the stop lever or pressure sensor on the handle. With this type of safety device, therefore, the worker must be always conscious of this condition. However, in case the worker falls down off balance during a work with the work apparatus, all his attention will be directed to regaining his footing, and will fail to unlink the hands from the handle. Otherwise, the worker might have got in a situation incapable of pulling back his hand away from the handle. Since brush cutters, chainsaws, and the like, are power-driven, cutter-equipped tools, workers may be driven into other dangerous conditions as well. Therefore, the safety device should be automatically actuated whenever necessary, not depending upon the operation by the worker.

In the safety device taught by Patent Document 3, which uses piezoelectric element as the shock sensor, a box is provided at a handle portion of the manipulation tube (main tube) surrounding the power transmission shaft for transmitting the power from the drive source to the cutting blade such that the piezoelectric element (sensor) on the box detects displacement of the axis of the manipulation tube. That is, this safety device detects a contact pressure between the piezoelectric element and the manipulation tube. Therefore, to ensure accurate receipt of an input from the manipulation tube, the box supporting the piezoelectric element must have a considerable rigidity. In addition, sensitivity of the piezoelectric element depends on where of the manipulation tube in its circumferential direction the piezoelectric element is located. For example, if the piezoelectric element should be responsive to up-and-down vibration of the manipulation tube, it need be placed on the top or bottom surface of the manipulation tube. If it should be responsive to right-and-left vibration, it must be placed on the left or right surface of the manipulation tube.

Therefore, due to the use of the contact type shock sensor, the safety device of Patent Document 3 must have a strong design for the box for supporting the sensor, and this causes an increase of the weight of the work apparatus. Furthermore, such a contact type shock sensor involves a difficulty in determining where of the circumferential position of the manipulation tube it should be located.

As an alternative mechanism usable in place of the pressure contact type shock sensor referred to above, it would be possible to employ a mechanical shock detection switch. Japanese Patent Laid-open Publication No. 2006-172984 discloses a fall detecting switch for use in a portable computer to prevent damage of its hard disk when the computer drops. This switch is a combination of a plummet provided at a free end of a cantilever coil spring and a cylinder that accommodates the plummet.

Japanese Patent Laid-open Publication No. 2006-172984 also discloses a mechanical shock detection switch for activating an automobile air bag mechanism. This is an inertial switch as a sensor for an air bag. This inertial switch includes a plummet supported in a case by a tensile spring and a ring housing the plummet to output an ON signal for deflating an air bag when the plummet swings with a shock and contacts the ring.

Japanese Patent Laid-open Publication No. H11(1999)-2642 teaches a structure in which a fixed lead and a movable lead are contained in a sealed case and a plummet is attached at an end of the movable lead. When the plummet moves in its detection direction into contact with an end of the fixed lead upon application of a shock, an ON signal is outputted to deflate an air bag.

Japanese Patent Laid-open Publication No. 2002-311047 discloses an acceleration detection switch as a sensor for activating an air bag. This acceleration detection switch has a plummet supported by a spring. When the plummet moves in its detecting direction, the switch turns ON.

Japanese Patent Laid-open Publication No. 2003-90846 discloses an acceleration detection switch as a sensor for an air bag. This switch has a slidable shaft extending through a through hole of a mass body. When the mass body moves by a given amount with a shock, the switch turns ON.

Japanese Utility Model Registration Publication No. 3012477 uses a switch having a movable contact tensely pulled down by a spring. When the movable contact swings into contact with a fixed contact, the switch turns ON.

Not limited to the above examples, there are many proposals of shock detection switches. It would be possible to use one of such mechanical shock detection switches to form a safety device of a brush cutter having a cutting blade. In this case, however, since the shock detection switch itself already includes some components, the safety device will inevitably become complex in structure due to an increased number of components. Additionally, in a work apparatus using an engine, for example, if such a safety device is located near the engine, a new problem of malfunction or durability arises due to engine vibration.

In view of these problems, the Inventors made researches with the intention of employing a shock detecting means that is relatively simple but can reliably detect that a worker has been exposed to danger. More specifically, from the standpoint of enhancing the accuracy of a safety device in function for protecting a worker from a cutting blade when any unexpected accident occurs, the Inventors made detailed reviews regarding when and how workers are most possibly exposed to danger while they are cutting grass or shrubs with a brush cutter.

A first possible situation is that, when a cutting blade hits a rock, stump or the like, the brush cutter has been kicked back and the worker can no longer control the brush cutter. In this case, it is highly possible that the worker is exposed to an unexpected danger. A second possible situation is that the worker has fallen down while at work. In this case, as well, it is highly possible that the worker is exposed to an unexpected danger. A third possible situation is that, perceiving a danger, the worker threw the brush cutter or unlinked his or her hands from the handle. In this case, as well, it is highly possible that the worker is exposed to an unexpected danger. Therefore, it is desirable for the safety device to reliably operate when any of those three situations is actually present. It is of course desirable that the safety device does not rely on operator's manipulation.

On the other hand, once the safety mechanism reliably operates and keeps the worker safe, this means that nothing occurred to the worker himself. Usually, therefore, the worker will want to resume and continue his work immediately. Therefore, the safety device must satisfy this worker's request.

Let reference be made again to the three situations very likely to expose the worker to danger, that is, (1) the situation where the brush cutter is no Mere longer controllable due to the kickback; (2) the situation where the worker fell down off balance; and (3) the situation where the brush cutter dropped down to the ground. One of features common to all of these situations a momentary large impulse and a large posture change of the brush cutter. A choice for detecting such a momentary impulse or a change in posture is the use of an acceleration sensor of a non-contact type. A non-contact sensor allows a wider choice for its mounting position and does not require a rigid box unlike a contact type sensor.

However, in relation to brush cutters equipped with a cutting blade, no safety devices employing an acceleration sensor as a shock sensor have heretofore appeared and even a proposal of such devices has been found. Its potential reason is that such a brush cutter is subjected to various kinds of vibration, and it is difficult to determine a threshold for distinction of shocks under conditions likely to expose the worker to danger from other impulses and vibration inherent to normal work.

Additionally, determination of a threshold value is more difficult to properly detect those three situations with a single acceleration sensor. In regard to the kickback, the threshold may be the highest acceleration value corresponding to the intensity of kickback the worker will be able to withstand. However, to reliably activate the safety device upon the falling (2) of the worker and the dropping (3) of the brush cutter, a lower threshold will be appropriate.

If a relatively low threshold is determined to put more importance to safety, the safety device will be excessively sensitive to acceleration resulting from inherent vibration of the work apparatus including the engine and will result in executing forcible interruption of the cutting work. Of course, this is a decrease of the workability of the work apparatus. Therefore, users will refrain from purchasing work apparatuses having an excessively sensitive safety apparatus even though they are excellent in terms of safety.

It is therefore an object of the present invention to provide a brush cutter equipped with a safety device that assures reliable safety control operation in an application using an acceleration sensor to detect a sudden danger a worker at work with the brush cutter has not expected.

SUMMARY OF THE INVENTION

The inventors have reached the present invention by taking it into consideration that such acceleration sensors have their own particular detection axes.

More specifically, the Inventors paid attention to movement of a cutting blade in operation. When a worker operates a brush cutter, its cutting blade is moved right while cutting grass or shrubs along substantially one plane (typically the ground). Even when a kickback occurs, if the worker can resist it and continues the work, the posture change of the cutting blade is relatively small. In contrast, if the worker cannot resist the impulse by the kickback, he/she will become unable to control the brush cutter, and both the brush cutter and the cutting blade will largely change their orientations.

The present invention employs a configuration in which the detection axis of the acceleration sensor inclines from a right-and-left direction to lower the detection capability of the of the acceleration sensor during normal operation. More specifically, according to the invention, there is provided a brush cutter including a drive source and a cutting blade rotated at a high speed with a drive force supplied from the drive source through a power transmission shaft in a manipulation tube, and equipped with a safety device for protecting a user from a cutting blade upon occurrence of an unexpected danger, if any, during a cutting work with the brush cutter, comprising:

an acceleration sensor borne on said drive unit for detecting an acceleration; and supplying an output; and a controller supplied with the output from said acceleration sensor to output a safety signal for activating the safety device when the acceleration detected by the acceleration sensor is higher than a threshold, wherein said acceleration sensor is attached to said drive unit in such an orientation that a detection axis thereof inclines from a right-and-left direction of the brush cutter.

In the brush cutter according to the invention, the detection axis DA is aslant from the right-and-left direction in which a cutting blade C is moved by the user during a cutting work as shown in FIG. 1. The angle of inclination of the detection axis DA relative to the right-and-left direction is shown by θ1 in FIG. 1.

The inclined placement of the detection axis DA of the acceleration sensor lowers the sensitivity of the acceleration sensor to acceleration in the right-and-left direction that is the moving direction of the cutting blade C in normal operation with respect to the original sensitivity of the acceleration sensor. Degree of the decrease in sensitivity is determined by the angle of inclination θ1 of the detection axis. This is always applicable regardless that the acceleration sensor has a single detection axis, two axes or three axes. When, for example, an acceleration having two detection axes is used, one of these two axes may be inclined from the right-to-left direction, and the suppression degree of the sensitivity to acceleration in right-and-left direction in normal operation can be optimized by adjusting the angle of inclination θ1.

The inclination of the detection axis DA relative to the right-and-left direction contributes to lowering the sensitivity of the acceleration sensor to kickback impulses. Therefore, when a threshold for activating the safety device should be determined at a critical value corresponding to the limit of kickback intensity a worker will be able to resist, a relatively low threshold can be selected. Therefore, according to the invention, even when a relatively low value is used as the threshold for activating the safety device, the safety device is prevented from being excessively sensitive to non-serious kickbacks of a level the user of the brush cutter can resist.

The opposite aspect of enabling the use of a relatively low threshold value is to ensure reliable detection of accidents, such as falling of the worker or dropping of the brush cutter to the ground, which will cause large, sudden changes in orientation and position of the brush cutter. Additionally, since the safety device operates relying on the acceleration sensor and not on user's manipulation, the worker can continue or resume his/her work unconsciously of activation of the safety device.

Regarding the level of kickback the safety device should be responsive, each user can cope with it by adjusting the angle of inclination of the acceleration sensor and thereby adjusting the angle of inclination of the detection axis relative to the right-and-left direction. Thus, the user can tune the safety device of his/her brush cutter to meet his/her particular work environment, habit, physical strength, and/or other factors.

In a preferred embodiment of the invention, the safety device comprises an acceleration sensor unit incorporating the acceleration sensor explained above; a shock signal generating means that forms a part of the controller and generates a shock detection signal when the acceleration detected by the acceleration sensor is higher than the threshold; and a timer means for holding the shock detection signal for a predetermined time. Once the acceleration sensor unit is attached to the brush cutter by adjusting the angle of the sensor unit relative to the brush cutter, the detection axis of the acceleration sensor in the sensor unit can be automatically inclined relative to the "right-and-left direction". Sensor units of this type are commercially available as a commodity. Therefore, such a commercially available sensor unit may be used to make up the safety device of the work apparatus, which will contribute to cost reduction. Additionally, since the shock detection signal is kept on for the given time, it is possible to reliably start the operation of the brush cutter.

Commercially available sensor units of this type include a lineup of different versions of various sensitivities. Therefore, one of them with an optimum sensitivity in compliance with the user's work environment, habit, physical strength, and/or other factors may be attached to a brush cutter to deliver a brush cutter equipped with the safety device best tuned for the user.

The acceleration sensor used in the present invention is of a non-contact type. Therefore, the acceleration sensor allows free choice for its mounting position and does require a rigid box. Thus, the safety device can be incorporated into the brush cutter without inviting an increase of the weight.

DETAILED DESCRIPTION OF THE INVENTION

Preferred embodiments of the present invention will be explained below with reference to the accompanying drawings.

Figure 1:
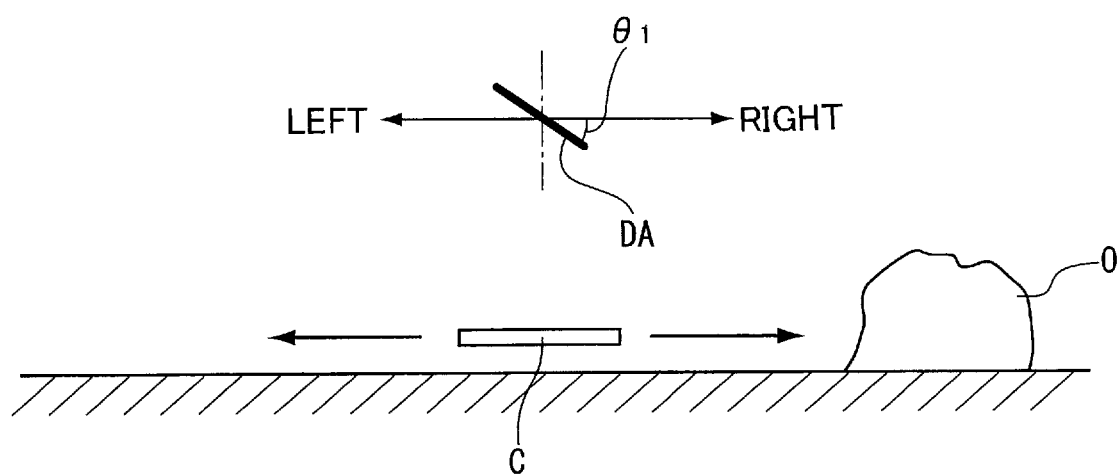
FIG. 1 is a diagram illustrating that a detection axis of an acceleration sensor inclines relative to a right-and-left direction that is a moving direction of a cutting blade when a brush cutter is in operation.
Figure 2:
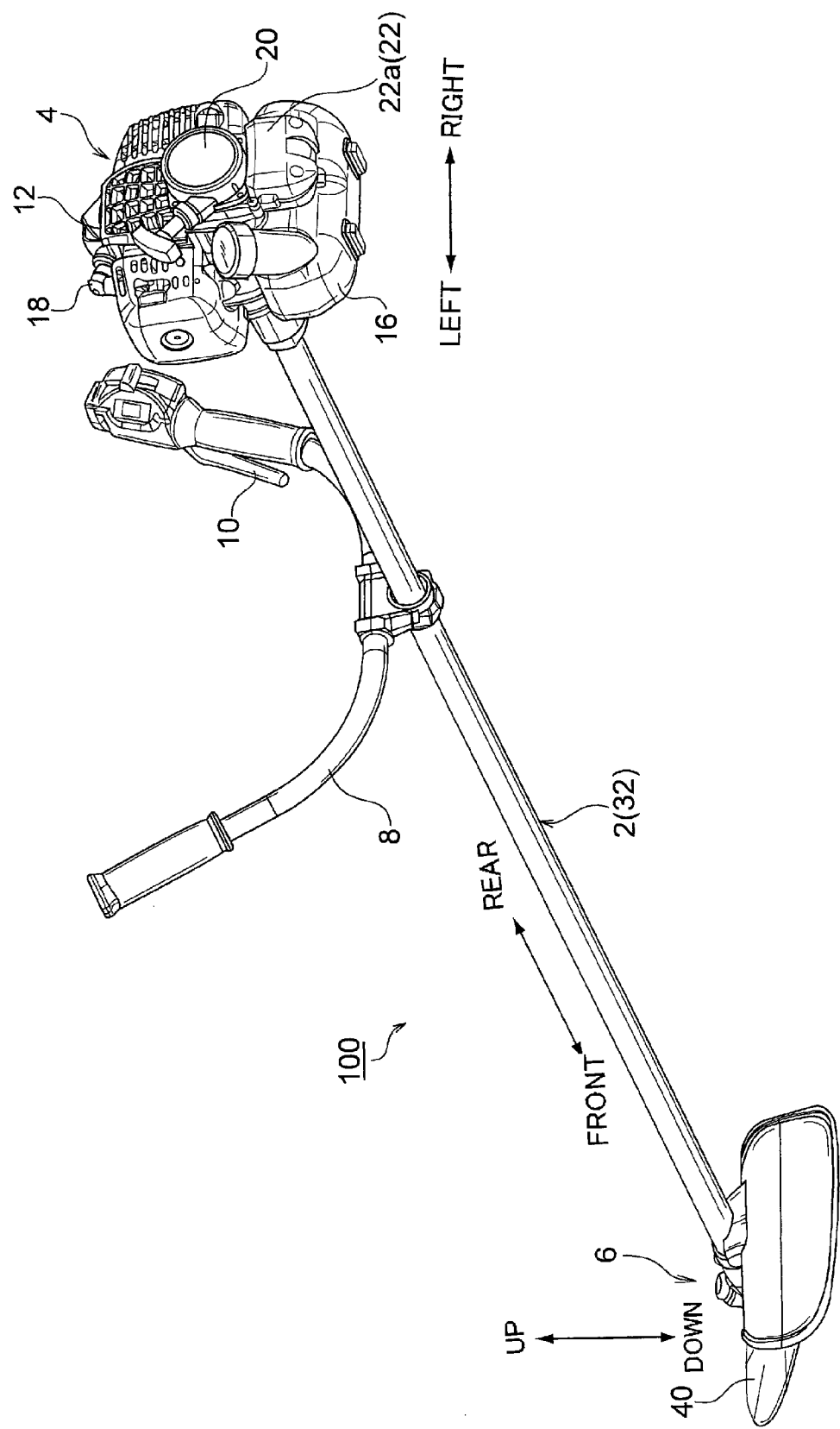
FIG. 2 is perspective view of a shoulder-strap type brush cutter according to an embodiment of the present invention.
Figure 3:
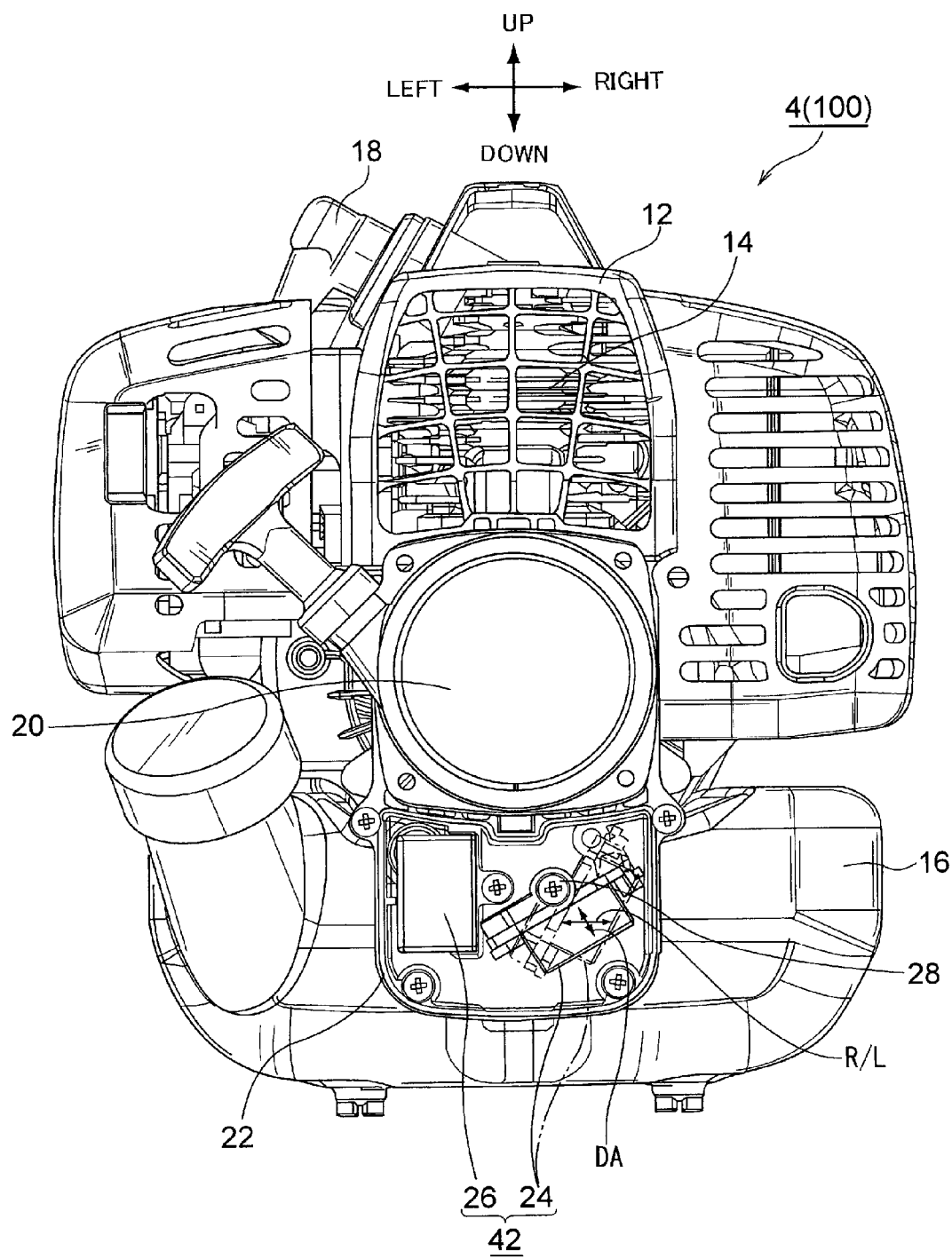
FIG. 3 is a rear view of a drive unit of the brush cutter of FIG. 2.

FIGS. 2 and 3 show a shoulder-strap type brush cutter according to an embodiment of the present invention. With reference to FIG. 2 that is a perspective view of the brush cutter, the brush cutter 100 includes a manipulation tube 2, a drive unit 4 located at a proximal end of the manipulation tube 2, and a cutter unit 6 located at a distal end of the manipulation tube 2. The manipulation tube 2 has a handle 8 attached to its lengthwise middle portion. The above construction is well known. The handle 8 has a throttle lever 10, etc., provided thereon. By operating the throttle lever 10, the worker can adjust the operation speed of the cutter unit 6.

The drive unit 4 includes an air-cooled single-cylinder two-stroke internal combustion engine 14 (FIG. 3) covered with an engine cover 12 and a fuel tank 16 disposed adjacent to and under the engine 14. The engine 14 runs using the fuel supplied from the fuel tank 16. The single-cylinder internal combustion engine 14 is mounted in the drive unit 4 such that the axial line of the cylinder bore extends vertically. In FIGS. 2 and 3, reference numeral 18 indicates an ignition plug. The ignition plug 18 is affixed to the top of the engine 14. Reference numeral 20 indicates a recoil starter. The recoil starter 20 is mounted on the back of the drive unit 4 to project rearward. By operation of the recoil starter 20, the engine 14 can be started. A shock detection box 22 is disposed in a dead space under the recoil starter 20 at the back of the fuel tank 16.

FIG. 3 is a view of the brush cutter 100 taken from its rear end direction, namely, from the side opposite from the cutter unit 6. In FIG. 3, the shock detection box 22 is shown with its cover 22a removed. The shock detection box 22 has provided therein an acceleration sensor unit 24 and a controller 26 comprising a microcomputer.

The acceleration sensor unit 24 includes a piezoelectric sensor. The piezoelectric sensor has a pickup made of a piezoelectric ceramic bonded on a thin disk-shaped metallic sheet. The pickup has a single detection axis. Sensor units of this sort are commercially available. Among those, this embodiment uses a sensor unit identified by model number GLD or SDS, both manufactured and marketed by SEN-SATEC Co., Ltd. (Head Office: Namikawa, Oimachi, Kameoka-shi, Kyoto, Japan). This acceleration sensor unit 24 exhibits stable output characteristics in the frequency range of 1 kHz and below. The acceleration sensor unit 24 is one of some versions available, which are different in sensitivity. Alternatively, instead of using such a commercially available acceleration sensor unit 24, a solo-type acceleration sensor AS, such as a semiconductor sensor, may be assembled in the brush cutter 100. A typical example of semiconductor sensor is a piezoelectric element sensor. Well-known semiconductor sensors include a uniaxial type having a single detection axis, biaxial type having two axes of detection, and a triaxial type having three axes of detection. According to this embodiment, any one of these uniaxial, biaxial and triaxial types may be used as the acceleration sensor AS. However, the uniaxial type acceleration sensor AS has the advantage of simplifying processing by the controller 26.

The commercially available acceleration sensor unit 24 includes a multi-vibrator circuit that keeps the maximum acceleration of a detected shock for a given time (for example 5 seconds) and, if the maximum acceleration exceeds a predetermined threshold, continues outputting a shock detection signal for a predetermined duration. In other words, this acceleration sensor unit 24 not only detects the acceleration but also performs a part of the function of the controller 26. That is, it functions as a timer for keeping the maximum acceleration of a momentary shock for a predetermined time and, if the maximum acceleration exceeds the threshold, for continuously outputting a shock detection signal for a predetermined time. In case the safety device is made up of a combination of a solo acceleration sensor AS with the controller 26 instead of the acceleration sensor unit 24, it is recommended to incorporate the timer function in the controller 26.

Figure 4:
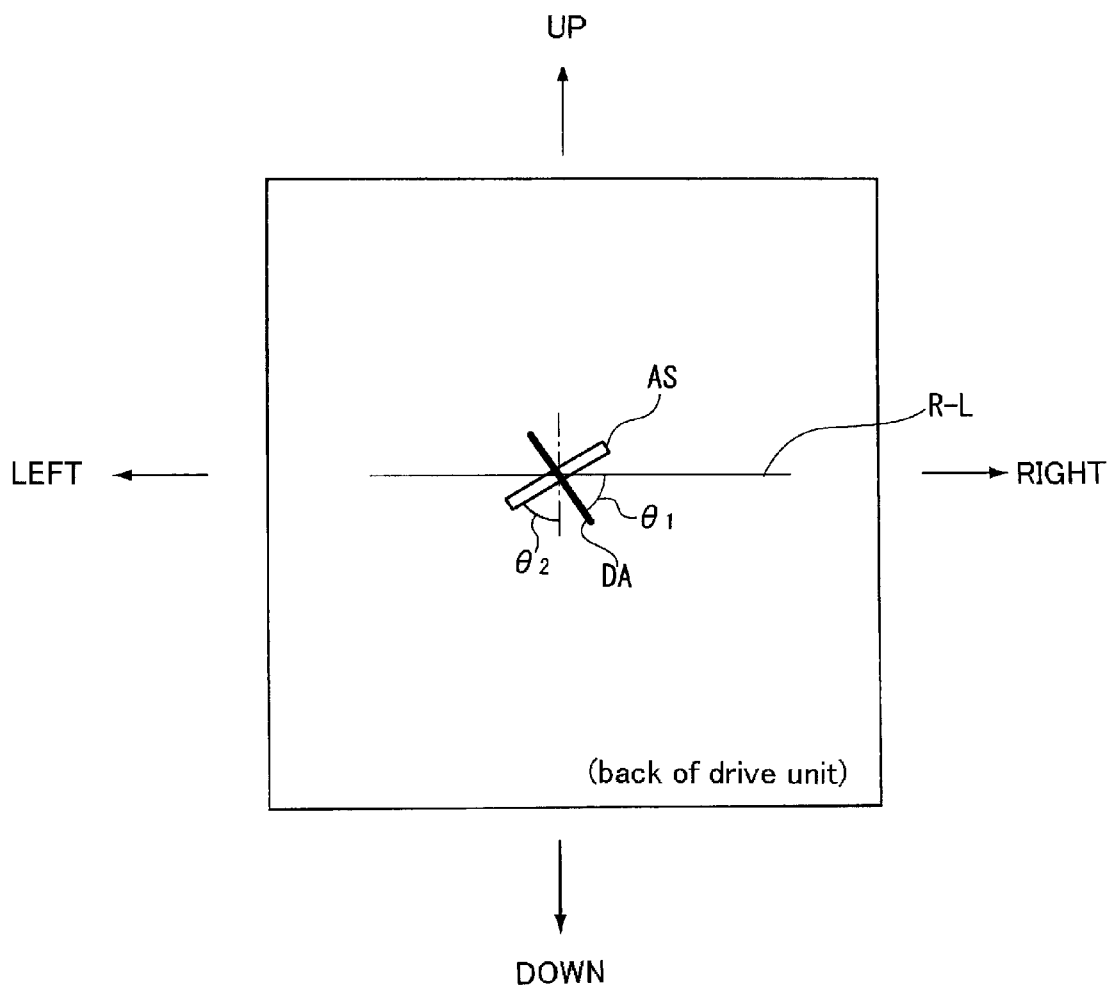
FIG. 4 is a diagram for explaining the detection axis of a single-axis acceleration sensor attached to the back face of the drive unit of the brush cutter that inclines from the right-and-left direction.

The single detection axis of the acceleration sensor contained in the acceleration sensor unit 24 is shown by an arrow DA in FIG. 3. A left-pointed arrow, right-pointed arrow and line R-L in FIG. 4 shows the right-and-left direction in which the drive unit 4 moves as the worker moves the cutter unit 6 right and left in a cutting operation with the brush cutter 100 by gripping the handle 8 (FIG. 2).

As readily understood from FIG. 3, when the brush cutter 100 is seated on the horizontal plane, the acceleration sensor unit 24 is oriented. Accordingly, the detection axis DA is aslant from the right-and-left line R-L on a vertical plane parallel to the axis of the cylinder bore ($\theta 1$ of FIG. 4). In order for the detection axis DA to incline from the right-and-left line R-L, the acceleration sensor unit 24 is attached to the brush cutter 100 in an inclined orientation. $\theta 2$ of FIG. 4 shows the angle of inclination of the piezoelectric sensor AS that is a component of the sensor unit 24.

Figure 5:
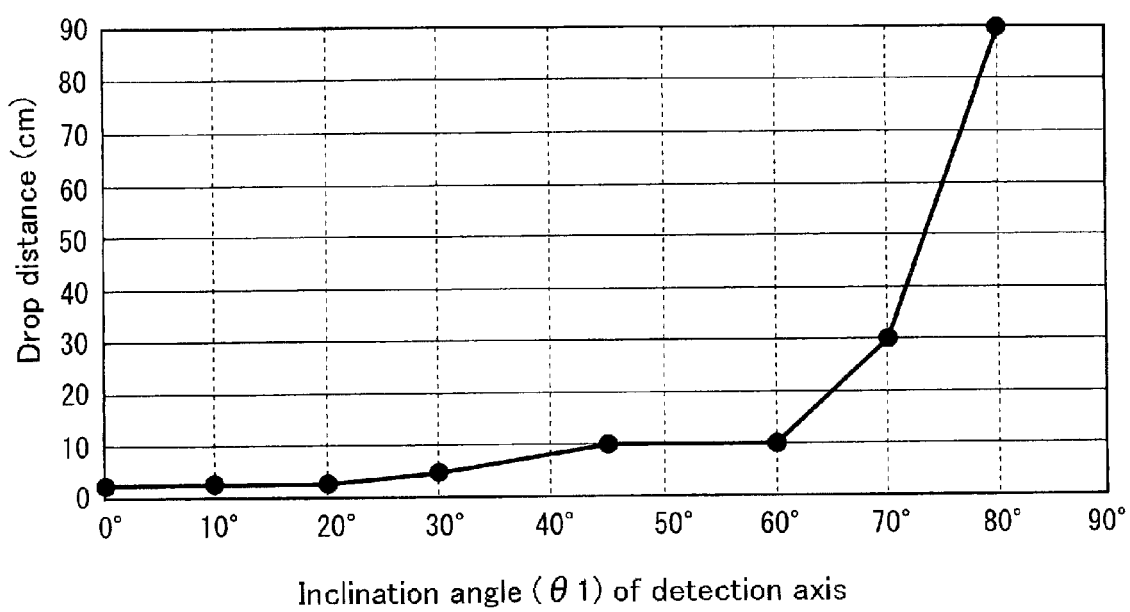
FIG. 5 shows data obtained by measuring the angle of inclination of the detection axis and the sensitivity of the acceleration sensor.

FIG. 5 shows relation between the inclination angle $\theta 1$ of the detection axis DA of the acceleration sensor unit 24 and sensitivity of the acceleration sensor unit 24. FIG. 5 shows data obtained by measuring vertical drop distances of the brush cutter 100 dropping to the ground and monitoring responsive outputs of a predetermined value from the acceleration unit 24. In other words, the data of FIG. 5 show to which value of height the acceleration sensor unit 24 was responsive and outputted a shock detection signal in the test of having the brush cutter 100 free-fall from various heights to the ground, With reference to FIG. 5, let it further be considered to change the mounting angle of the acceleration sensor unit 24 to thereby change the inclination angle $\theta 1$ of the detection axis DA from the vertical dropping direction of the brush cutter 100. If the inclination angle $\theta 1$ of the detection axis DA is 45 deg. for example, the acceleration sensor unit 24 issues a shock detection signal when the brush cutter 100 is left freely dropping from the height of about 10 cm. In case the inclination angle $\theta 1$ is 70 deg., the acceleration sensor unit 24 issues a shock detection signal when the brush cutter 100 freely drops from the height of about 30 cm. In case the inclination angle $\theta 1$ is 80 deg., the acceleration sensor unit 24 issues a shock detection signal when the brush cutter 100 freely drops from the height of about 90 cm. It will be understood from FIG. 5 that the larger the inclination angle $\theta 1$ of the detection axis DA, the lower becomes the sensitivity of the acceleration sensor unit 24.

Referring back to FIG. 3 again, the inclined mounting orientation of the acceleration sensor unit 24 can be adjusted, by loosening a screw 28, to have any desired angle of inclination in a range from a first inclined position indicated with a solid line to a second inclined position indicated with an imaginary line. Thus, the inclination angle $\theta 1$ of the detection axis DA can be changed to adjust the sensitivity of the acceleration sensor unit 24 to an impulse in the right-and-left direction that is the moving direction of the cutting blade 40 driven by the worker in grass or shrub cutting operation. Of course, the acceleration sensor unit 24 can be fixed in an inclined position by tightening the screw 28. The illustrated example is designed to allow the user of the brush cutter 100 to select one of the two different inclined positions, namely, the first inclined position indicated with the solid line and second inclined position indicated with the imaginary line in FIG. 3 by turning the acceleration sensor unit 24 about the screw 28. However, the brush cutter 100 may be arranged such that the user can select one of three or more inclined positions. The brush cutter 100 may also be designed to have the inclination angle $\theta 2$ of the pickup surface of the acceleration sensor unit 24 be fixed at any desired angle between the first and second inclined positions in a continuously variable manner.

Figure 6:
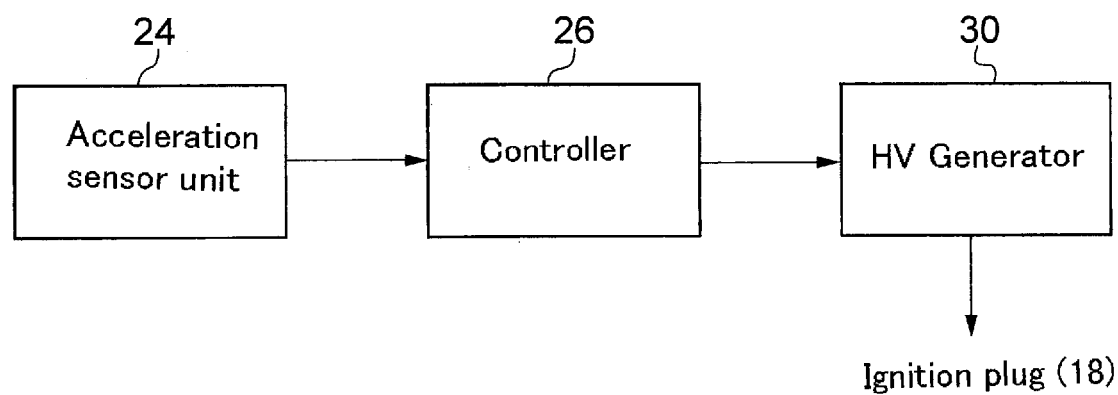
FIG. 6 is a block diagram of a safety device using a commercially available acceleration sensor unit and an object to be controlled by the safety device.

Once the acceleration sensor unit 24 detects an acceleration reaching the predetermine value (threshold value), it continuously supplies the shock detection signal to the controller for a predetermined time (for example, 5 seconds) after detection of this acceleration as already explained. As shown in FIG. 6, in receipt of the shock detection signal from the acceleration sensor unit 24, the controller 26 supplies a safety signal to a high voltage generating circuit 30 used to supply a high voltage to the ignition plug 18, and continues this supply of the signal for a predetermined time. As a result, the high voltage generating circuit 30 is inactivated and cannot generate the high voltage for a predetermined time (for example 5 seconds). Because of the interruption of the high voltage to the ignition plug 18, the engine 14 stops. Thereafter, however, if the supply of the high voltage to the ignition plug is immediately resumed, it may possibly occur that the engine 14 restarts due to an inertial force. Therefore, as the length of time for removing the possibility of restarting the engine, the time of 5 minutes, for example, is required. Of course, a longer time may be set by a timer as the waiting time. The safety control explained above stops power supply to the primary coil of the high voltage generator immediately upon receipt of the shock detection signal from the acceleration sensor unit 24. Continuation of the power interruption for the predetermined time ensures the engine to stop completely. Then, it results in stopping the function of the cutting blade 6 and stopping rotation of the cutting blade.

Figure 7:
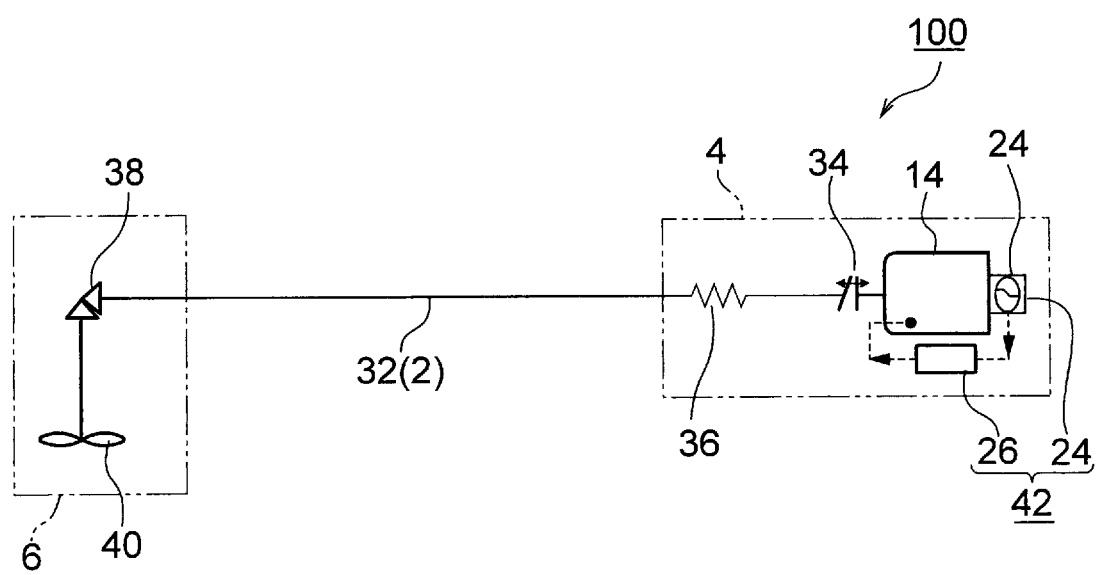
FIG. 7 shows a basic construction of the brush cutter in FIG. 2.
Figure 8:
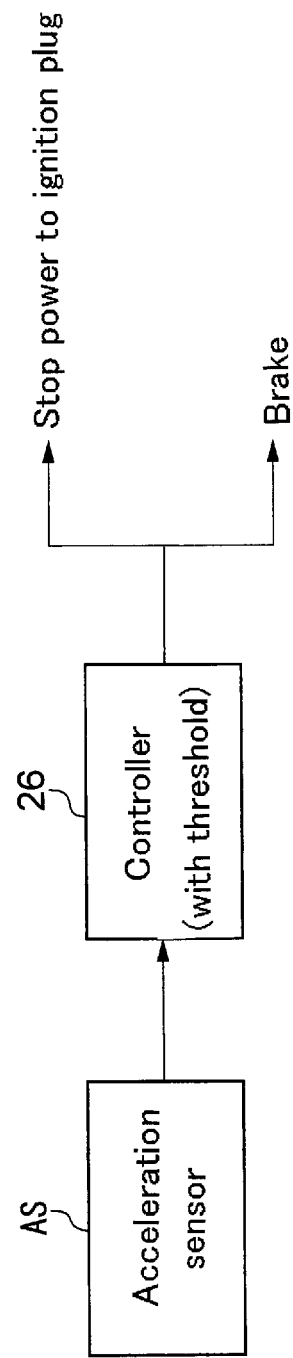
FIG. 8 is a block diagram of a safety device using an acceleration sensor and an object to be controlled by the safety device.

FIG. 7 shows a basic construction of the brush cutter 100 explained above. The engine 14 provided in the drive unit 4 supplies its output to the cutter unit 6 through a power transmission shaft 32 interposed in the manipulation tube 2. The drive unit 4 has a centrifugal clutch 34 and a damper 36 both interposed between the engine 14 and power transmission shaft 32. Further, a bevel gear 38 is provided in the cutter unit 6 to couple the power transmission shaft 32 and disk-shaped cutting blade 40 to each other.

As explained heretofore, in the brush cutter 100 according to the embodiment, the safety device 42 comprising the acceleration sensor unit 24 and the controller 26 immediately stops the supply of the high voltage to the ignition plug 18 and thereby stops the engine 14 when the acceleration sensor unit 24 detects an acceleration equal to or higher than a predetermined value. Since the output of the acceleration sensor unit 24 is continuously supplied to the controller 26 for a predetermined time (for example, 5 seconds), the engine 14 can be stopped reliably. In other words, if the safety signal outputted from the controller 26 ends in a relatively short time, the engine 14 will undesirably restart with the inertial force remaining in the engine 14 immediately after the safety signal is turned OFF. The present invention reliably prevents such undesirable, accidental movement of the brush cutter 100.

Inclining the detection axis of the piezoelectric sensor AS relative to the right-and-left direction R-L contributes to lowering the sensitivity of the piezoelectric sensor AS to impulses in the right-to-left direction that is the moving direction of the cutting blade 40, that is, the capability of detecting the acceleration.

The threshold is chosen to be near a value corresponding to a kickback impulse an ordinary worker will be able to withstand. As already explained, some versions of acceleration sensor unit 24 of different sensitivities are commercially available. Therefore, instead of changing the threshold preset in a memory of the acceleration sensor unit 24 or the controller 26, the preset value of the threshold can be adjusted substantially by re-mounting a sensor unit 24 of a different sensitivity on the brush cutter 100. In other words, each user can purchase a brush cutter 100 tuned in sensitivity of its safety device to meet each user's intended work environment, habit, etc. It is also possible for each user to tune the sensitivity to his/her satisfaction by his/her own effort after actually using the brush cutter 100 by resetting the acceleration sensor 24 unit more upright relative to the right-and-left direction R-L up to, for example, the second slanting position shown by the imaginary line in FIG. 3 if he/she wants to have the safety device activated more sensitively.

Upon receipt of a momentary shock, the acceleration sensor unit 24 keeps a detected maximum acceleration for 5 seconds, for example. Then, if the maximum acceleration is larger than the threshold, the acceleration sensor unit 24 supplies the shock detection signal for a predetermined time (5 seconds, for example). After that, however, since the shock detection signal turns OFF (output of the safety signal from the controller 26 turns OFF), the worker can start his work again, if he/she wants to do so, by simply manipulating the recoil starter 20 and thereby starting the engine without any other manipulation even though the engine 14 is once stopped forcibly by activation of the safety device 42 (output of the safety signal from the controller 26).

The safety device 42 of the brush cutter 100 has been explained above as incorporating the piezoelectric sensor as its acceleration sensor. The safety device 42, however, can be made by using a preferably single-axis solo-type acceleration sensor AS such as a semiconductor sensor. In this case, the acceleration sensor AS is attached to the brush cutter 100 such that the detection axis DA is aslant relative to the right-and-left direction R-L as explained above. Output of the acceleration sensor AS enters the controller 26. The controller 26 compares it with the preset threshold. If the acceleration detected by the acceleration sensor AS is higher than the threshold, the controller 26 issues a safety signal to the high voltage generating circuit 30. Upon receipt of the safety signal, the high voltage generating circuit 30 stops generation of the high voltage, and the engine stops immediately. A plurality of different threshold values may be stored in a memory of the safety device 42 such that distributors or users can select and set an optimum value suitable for a particular expected work environment.

The brush cutter 100 according to the above-explained embodiment can protect the worker against any sudden danger because the acceleration sensor unit 24 stops the engine when detecting a shock larger than a predetermined value. In relation to whichever component of the brush cutter will be suitable as the target to be controlled by a disabling means, i.e. safety device, for stopping the rotation of the cutting blade 40, a brake mechanism may be provided to stop the rotation of the cutting blade 40 instead of, or in addition to, forcibly stopping the engine.

Figure 9:
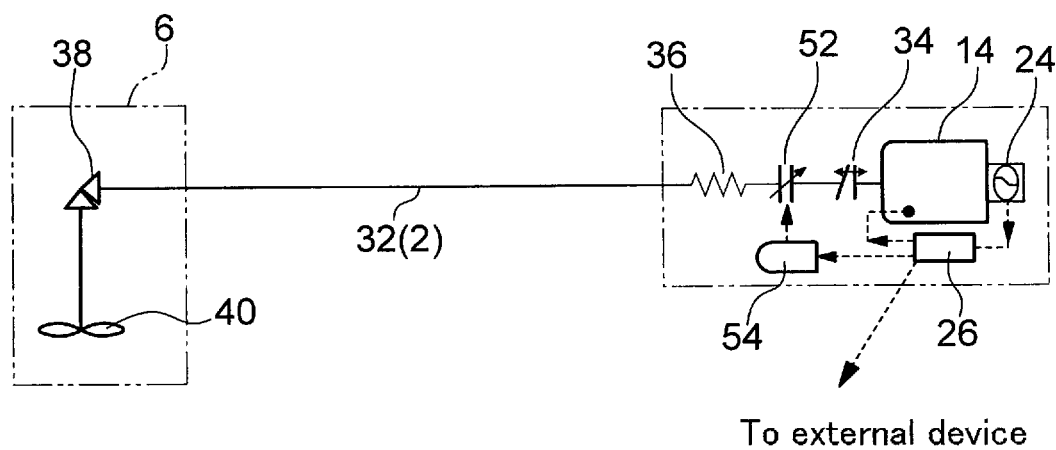
FIG. 9 is a diagram illustrating an example, which includes, as a subject for control by the safety device, braking of an output of a centrifugal clutch in addition to engine stop.

FIG. 9 shows an example in which, in addition to the configuration for non-firing the ignition plug, a brake 52 is provided between the centrifugal clutch 34 and the damper 36. The brake 52 is controlled by an actuator 54. When a safety signal is supplied to the actuator 54 from the controller 26, the brake 52 applies a braking force to the output part of the centrifugal clutch 34. This example of FIG. 9 employs the configuration in which the supply of the high voltage to the ignition plug 18 is stopped to thereby stop the engine by interrupting generation of the high voltage in the high voltage generating circuit 30, and additionally, a braking force is applied to the output part of the centrifugal clutch 34 as explained above. However, the control for stopping the engine may be omitted. It is also noted that the example of FIG. 9 is configured to supply a safety signal generated by the controller 26 to an external device. The external device may be a communication means, for example, which will receive the safety signal from the controller 26 and send an alarm to a work or business management company employing or managing the worker or a mobile phone of the worker's family.

Figure 10:
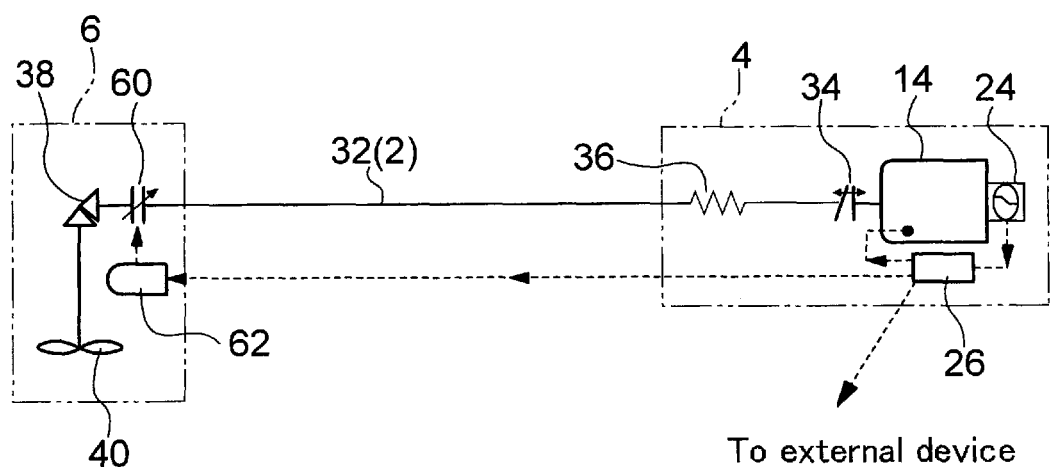
FIG. 10 is a diagram illustrating an example, which includes, as a subject for control by the safety device, braking an input to a bevel gear of the cutter unit in addition to engine stop.

FIG. 10 shows another example of the target to be controlled. The example of FIG. 10 uses a brake 60 provided just upstream of the bevel gear 38 in the cutter unit 6. The safety signal from the controller 26 is supplied to an actuator 62 for controlling the brake 60. Since this example includes the control by the brake 60 in addition to the control for stopping the engine, the cutting blade 40 positioned immediately downstream of the bevel gear 38 can be stopped from rotation in a direct manner. As an alternative, the embodiment of FIG. 10 may be modified to use a brake located at a distal end of the power transmission shaft 32 to apply a braking force to the distal end of the power transmission shaft 32.

Figure 11:
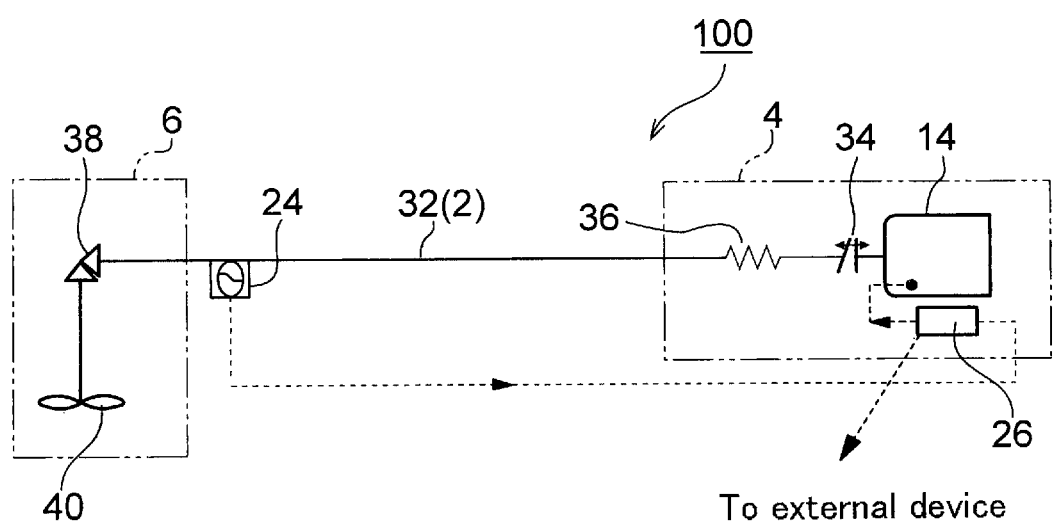
FIG. 11 is a diagram illustrating an example in which the acceleration sensor is attached to the distal end of a manipulation tube of the brush cutter to stop the engine when the acceleration sensor detects an impulse.

The acceleration sensor unit 24 or acceleration sensor AS may be attached in any location of the drive unit 4, such as on the inner surface of the engine cover 12 or in a dead space of the drive unit 4. Otherwise, location of the sensor unit 24 or acceleration sensor AS is not limited to the drive unit 4. Instead, it may be located in the cutter unit 6. FIG. 11 shows an example locating the acceleration sensor unit 24 or acceleration sensor AS at a distal end portion of the manipulation tube 2. Even when the acceleration sensor unit 24 or acceleration sensor AS is attached to a location other than the drive unit 4, it should be oriented such that its detection axis DA extends aslant from the right-and-left direction R-L.

In the example shown in FIG. 11, the acceleration sensor unit 24 or acceleration sensor AS is attached to a distal end portion of the manipulation tube, and power supply to the ignition plug 18 from the high voltage source is interrupted as in the above-explained embodiment when an acceleration higher than the threshold is detected.

Figure 12:
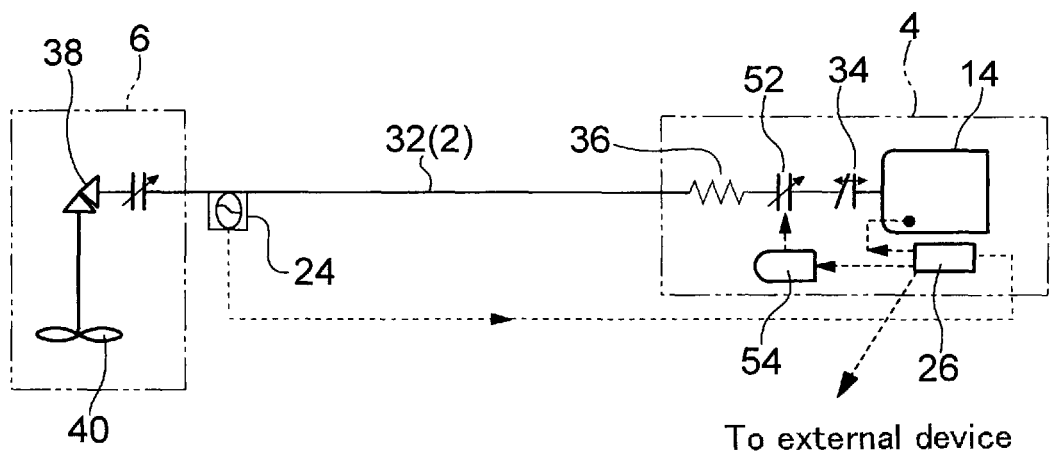
FIG. 12 is a diagram illustrating an example in which the acceleration is attached to the distal end of the manipulation tube of the brush cutter to stop the engine and additionally brake the engine output with a brake provided between the centrifugal force and a damper when the acceleration sensor detects an impulse.
Figure 13:
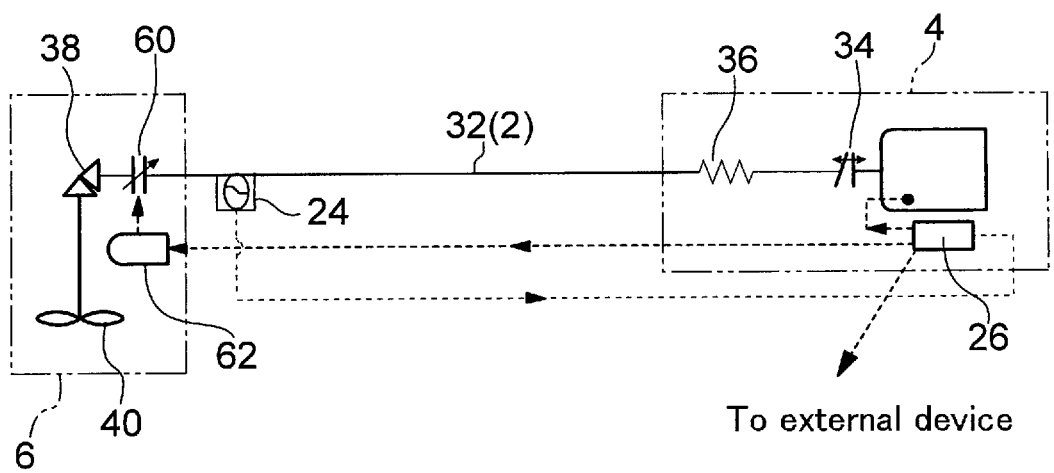
FIG. 13 is a diagram illustrating an example in which the acceleration sensor is attached to the distal end of the manipulation tube of the brush cutter to stop the engine and additionally applying a braking force to the bevel gear of a cutter unit.

Also in the case where the acceleration sensor unit 24 or acceleration sensor AS is attached in a location other than the drive unit 4, a braking force may be applied to the engine output by the brake 52 between the centrifugal clutch 34 and the damper 36 (FIG. 12). Alternatively, the braking force may be applied to the input of the bevel gear 38 of the cutter unit 6 by the brake 60 (FIG. 13).

Heretofore, some preferred embodiments and their modifications have been explained with reference to the drawings. The drive source of the brush cutter 100 may be an electric motor instead of an internal combustion engine. If the brush cutter 100 is motor-driven, motion of the cutting blade 40 can be stopped by forcibly interrupting power supply to the electric motor when the acceleration sensor unit 24 or acceleration sensor AS detects a large impulse.

Further, the shoulder-strap type brush cutter 100 has been explained as one of applications of the present invention by way of those preferred embodiments. The present invention, however, can be applied to a backpack type brush cutter as well. In case of a backpack type brush cutter, the acceleration sensor unit 24 or acceleration sensor AS should be attached to a portion other than the drive unit 4 that is carried on the user's back. The manipulation tube 2 or handle 8, for example, will be an appropriate portion for attaching the sensor. Even in this configuration, kickbacks can be detected.

Figure 14:
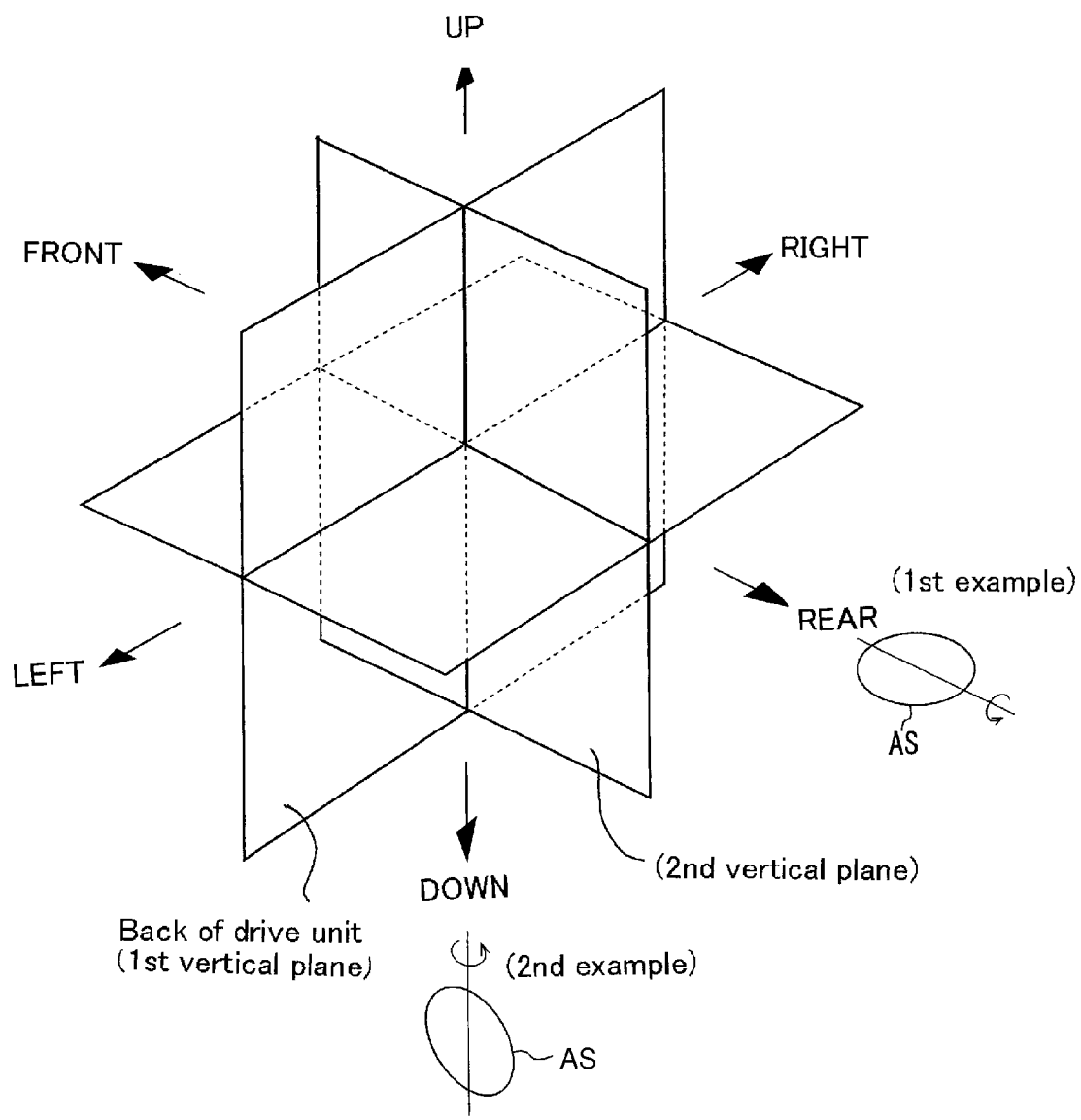
FIG. 14 is a diagram for explaining the degree of freedom for changing the orientation of a shock pickup face of the acceleration sensor when the detection axis of the acceleration sensor should be inclined relative to the right-and-left direction.

FIG. 14 is a diagram for explaining the degree of freedom allowed for orientation of the pickup surface of the acceleration sensor AS when the detection axis DA of the acceleration sensor AS is placed aslant relative to the right-left direction R-L. Among the terms "right", "left", "front", "rear", "up" and "down" used in FIG. 14, the terms "right" and "left" are used to specify the direction in which the cutting blade 40 is moved reciprocally by the worker in cutting operation with the brush cutter 100. The terms "front" and "rear" are used to show the direction approximately along the extending direction of the manipulation tube 2. In case the brush cutter 100 has a single-cylinder internal combustion engine 14, the terms "up" and "down" specify the axial direction of the cylinder bore of the internal combustion engine 14.

The detection axis DA of the acceleration sensor AS can be set aslant from the right-and-left direction R-L by placing the acceleration sensor AS to lay its shock pickup face on a horizontal plane and then turning the acceleration sensor AS about its own front-to-rear axis. In this first example, the acceleration sensor AS can detect acceleration in the right-and-left direction and acceleration in the up-and-down direction. Alternatively, the detection axis DA of the acceleration sensor AS can be set aslant from the right-and-left direction R-L by placing the acceleration sensor AS to lay its shock pickup face on a second vertical plane and then rotating the acceleration sensor AS about its own up-and-down axis. In this second example, the acceleration sensor AS can detect acceleration in the right-and-left direction and acceleration in the front-and-rear direction. In case the first and second examples are combined, the acceleration sensor AS can detect acceleration in any of three directions, namely, right-and-left, front-and-rear and up-and-down directions. The first and second examples are typical ways of "inclining the detection axis DA from the right-and-left direction" according to the present invention.

In any of the first and second examples, the user at work with the brush cutter 100 carries it to have the cutting blade 40 extended to a front down position as viewed from the worker. Therefore, even if the acceleration AS has been set like the first example, for instance, relative to the back face of the drive unit 4 (first vertical plane), it becomes, in the actual work environment, equivalent to positioning the shock pickup face of the acceleration sensor AS aslant of all of the three dimensional planes. Thus, the acceleration sensor AS can detect acceleration in any of front-and-rear, right-and-left and up-and-down directions.

What is claimed is:

1. A brush cutter including a drive unit having a drive source and further including a cutting blade rotated in a cutting plane at a high speed with a drive force supplied from the drive source through a power transmission shaft in a manipulation tube, said brush cutter equipped with a safety device for protecting a user from said cutting blade upon occurrence of an unexpected danger that may occur during a cutting operation with the brush cutter, said safety device comprising:
    an acceleration sensor of a non-contact configuration that detects acceleration along a detection axis of said acceleration sensor, said acceleration sensor attached in said drive unit for detecting said acceleration, and said acceleration sensor supplying an output; and
    a controller supplied with the output from said acceleration sensor to output a safety signal to said drive unit for stopping said drive source when said acceleration detected by the acceleration sensor is higher than a threshold,
    wherein said acceleration sensor is attached to said drive unit in such an orientation that said detection axis thereof inclines relative to said cutting plane for being at an inclined orientation while the brush cutter is being reciprocally moved by the worker during said cutting operation with said brush cutter.

2. The brush cutter according to claim 1 wherein said acceleration sensor is adjustable in a mounting angle thereof to adjust the detection axis thereof relative to the cutting plane.

3. The brush cutter according to claim 1 wherein said acceleration sensor is of a single-axis configuration.

4. The brush cutter according to claim 2 wherein said acceleration sensor is of a single-axis configuration.

5. The brush cutter according to claim 1 wherein said drive source is an electric motor.

6. The brush cutter according to claim 1 wherein said drive source is an internal combustion engine.

* * * * *